United States Patent [19]

Asai

[11] Patent Number: 4,760,991
[45] Date of Patent: Aug. 2, 1988

[54] TENSING ROPE

[75] Inventor: Masaki Asai, Nagoya, Japan

[73] Assignee: Meitoh Denki Kohji Kabushiki Kaisha, Nagoya, Japan

[21] Appl. No.: 73,365

[22] Filed: Jul. 10, 1987

Related U.S. Application Data

[63] Continuation of Ser. No. 769,000, Aug. 26, 1985, abandoned.

[30] Foreign Application Priority Data

Sep. 12, 1984 [JP] Japan .................. 59-191233
Nov. 5, 1984 [JP] Japan .................. 59-232665

[51] Int. Cl.$^4$ ............................................. B65H 59/00
[52] U.S. Cl. ............................................. 254/134.3 R
[58] Field of Search ............... 269/134.3 FT, 134.3 R

[56] References Cited

U.S. PATENT DOCUMENTS 2,479,224 8/1949 Flinn .................. 254/134.3 FT
3,137,765 6/1964 Lanum .................. 254/134.3 R
4,101,114 6/1978 Martin et al. .......... 254/134.3 FT

FOREIGN PATENT DOCUMENTS 644345 4/1937 Fed. Rep. of Germany ... 254/134.3 R

Primary Examiner—Frederick R. Schmidt
Assistant Examiner—Judy J. Hartman
Attorney, Agent, or Firm—Armstrong, Nikaido, Marmelstein & Kubovcik

[57] ABSTRACT

A tensing rope having an elongated rope body and abutments having frustum shells which are integrally connected to the rope body and which are spaced from one another at a constant distance along the length of the rope body.

12 Claims, 4 Drawing Sheets

TENSING ROPE

This application is a continuation of application Ser. No. 769,000 filed Aug. 26, 1985, now abandoned.

BACKGROUND OF THE INVENTION

1. Field of the Invention

The present invention relates to a tensing rope which can be used to newly string a power transmission line or a grid or to exchange an old line for a new one.

2. Description of the Related Art

In a conventional stringing or exchanging operation of a power transmission line or a grid, a device, such as a line tensing machine is used to tense a guide rope which extends between towers and which would otherwise tend to loosen, due to the elongation in the length thereof.

The line tensing machine has grippers which grip the rope to tense the same. However, if the grippers fails to firmly clamp the rope, a relative slip takes place between the grippers and the rope, thus resulting in failure of a stretch of the rope. On the contrary, if the grippers hold the rope with an excessively strong power, the rope can be damaged. In addition to the foregoing, it is very difficult for an operator to confirm the length of the rope that has been drawn to stretch the rope. The length to be drawn is predetermined in accordance with a coefficient of elongation of the rope.

SUMMARY OF THE INVENTION

The primary object of the present invention is, therefore, to provide a tensing rope which ensures an easy tension of the guide rope.

Another object of the present invention is to provide a tensing rope which can easily confirm the length of the guide rope that has been drawn to stretch the guide rope.

Still another object of the present invention is to provide a tensing rope which can be advantageously used particularly for stringing or exchanging a power transmission line or a grid.

It will be, however, appreciated that the application of the present invention is not limited to an electrical construction and the present invention can be generally used to tense a rope.

In order to achieve the objects mentioned above, according to the present invention, there is provided a tensing rope which comprises an elongated rope body and frustum abutments extending in the length of the rope body and rigidly connected to the rope body.

BRIEF DESCRIPTION OF THE DRAWINGS

The invention will be described below in detail with reference to the accompanying drawings which show preferred embodiments of the present invention and in which.

DESCRIPTION OF THE PREFERRED EMBODIMENTS

Figure 1:
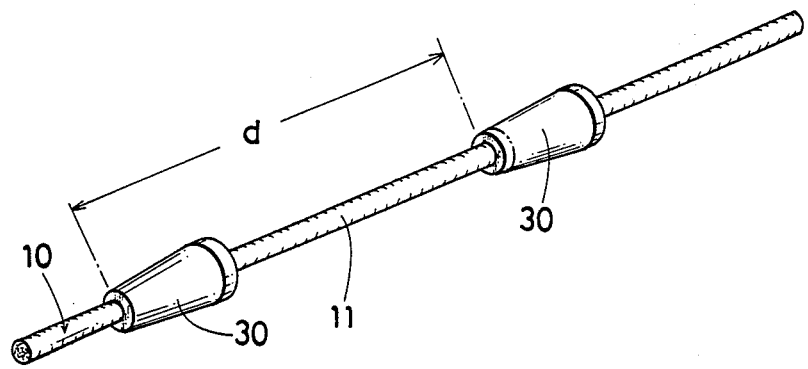
FIG. 1 is a partial perspective view of a tensing rope according to an embodiment of the present invention.

As can be seen from the drawings, the tensing rope 10 of the present invention essentially has an elongated body 11 and frustum abutments 30, 30 . . . forming engaging means, which have axes extending in the direction of the length of the rope body 11 and which are integral with the rope body 11.

The rope body 11 is preferaly in the form of a stiff or strong fiber rope which is usually and widely used in an electrical construction, consisting of a net core 12 made of, for example woven aromatic polyamide resin fiber or the like, having a small coefficient of elongation, and an outer insulation layer 13 of polyurethane resin covering the net core 12.

The abutments 30 are attached to the rope body 11 at a constant distance d which is preferaly in the range of 1 to 2 m (e.g. 2 m in the illustrated embodiment) along the length of the rope. The number of the abutments 30 depends on the total length of the rope and on the length of the rope to be drawn to tense the rope, and is usually about 4 to 6.

The rope body 11 has enlarged portions 14 which can be made, for example, by coil springs 20 inserted in the net core 12. The enlarged portions 14 are covered by plastic layers 25, for example of epoxy resin material. The plastic layers 25 have inclined outer surfaces. The abutments 30 are constituted by the outer inclined surfaces of the plastic layers 25 on which a tensing device 40 can be engaged by a so-called wedge effect.

Figure 5:
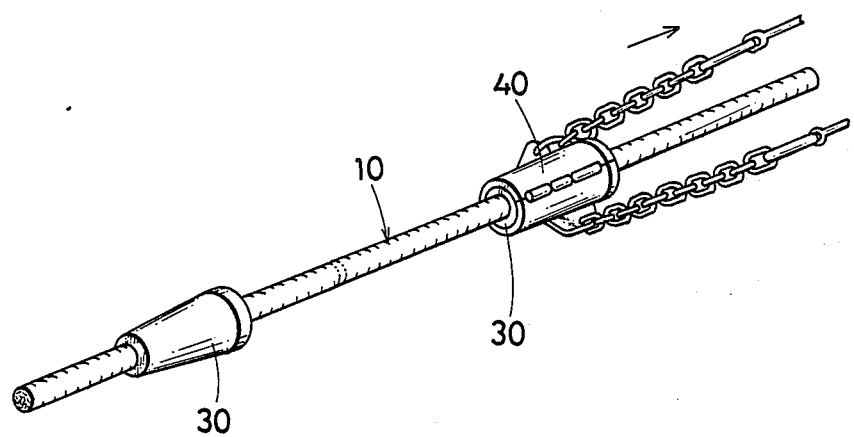
FIG. 5 is a perspective view of a tensing rope which is tensed by a line tensing device.

The enlarged portions 14 of the net core 12 of the rope body 11, made of expanding members, such as the coil springs 20 ensure a firm connection between the plastic layers 25 and the rope body 11. With this arrangement, the rope can be prevented from coming out of the associated wire tensing device 40, even when the associated abutment 30 is strongly pulled by the wire tensing device 40 (FIG. 5). The expanding material inserted in the net core 12 is made of preferably a member, such as coil spring or wiring which permits the plastic material forming the plastic layer 25 to impregnate the net core 12, to ensure a rigid interconnection between the plastic layer and the rope body 11.

As mentioned before, the abutments 30 can be made of the plastic layers 25 per se. In this case, the abutments 30 are integral with the plastic layers 25.

Figure 2:
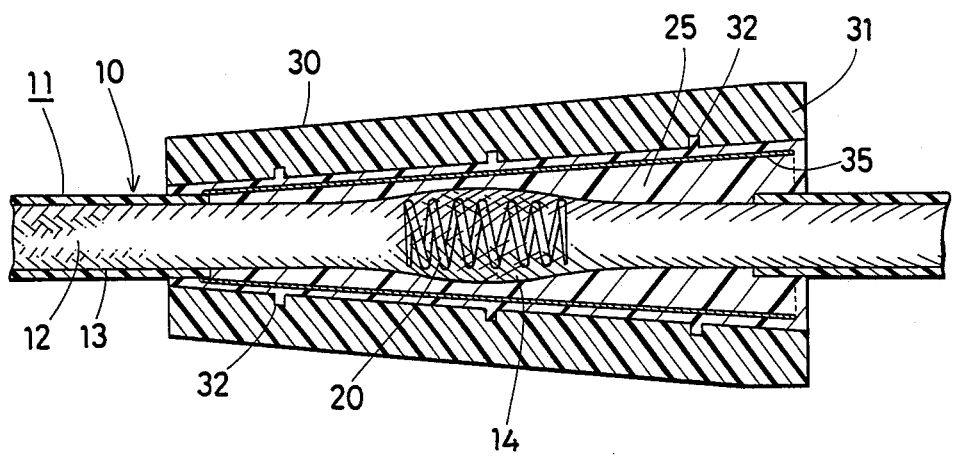
FIG. 2 is an enlarged sectional view of a main part of the tensing rope shown in FIG. 1.

Alternatively, it is also possible to make the abutments 30 by outer shells 31 which can be made of a metal or plastic frustum tube and which integrally cover the plastic layers 25, as shown in FIG. 2. The outer shells 31 have inclined outer surfaces corresponding to the tapered outer surfaces of the plastic layers 25.

In an embodiment illustrated in FIG. 2, the outer shells 31 are made of a stiff resin, such as nylon or polyacetal resin. The numeral 32 designate anchor grooves which the plastic material of the plastic layer 25 enters, so that the outer shells 31 can be firmly and integrally connected to the plastic layer 25. Preferably, reinforcing glass fiber sheets 35 are embedded in the plastic layers 25 to increase the strength of the plastic layer per se.

Figure 4:
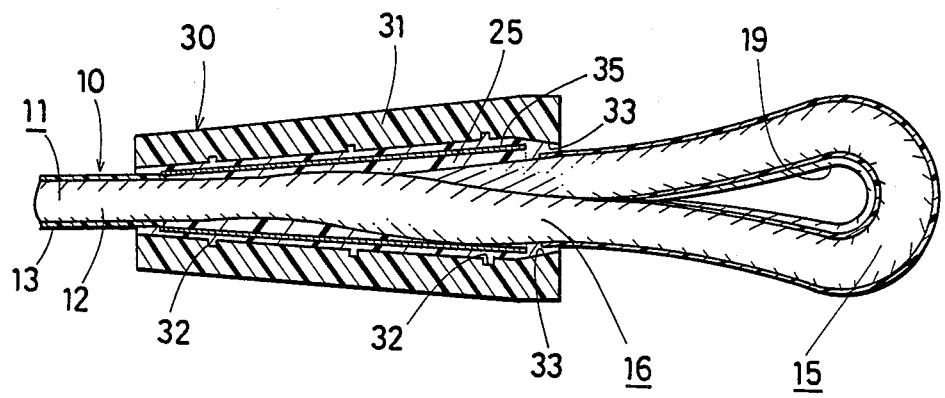
FIG. 4 is an enlarged sectional view of the tensing rope shown in FIG. 3.

The tapered surfaces of the outer shells 31 or the plastic layers 25 (in the case where the outer shells 31 are dispensed with) constituting the abutments 30 have diameters decreasing toward the front end, i.e. in the left end in FIG. 2 or 4, corresponding to an inner tapered surface (FIG. 7) of the associated wire tensing device 40.

Figure 3:
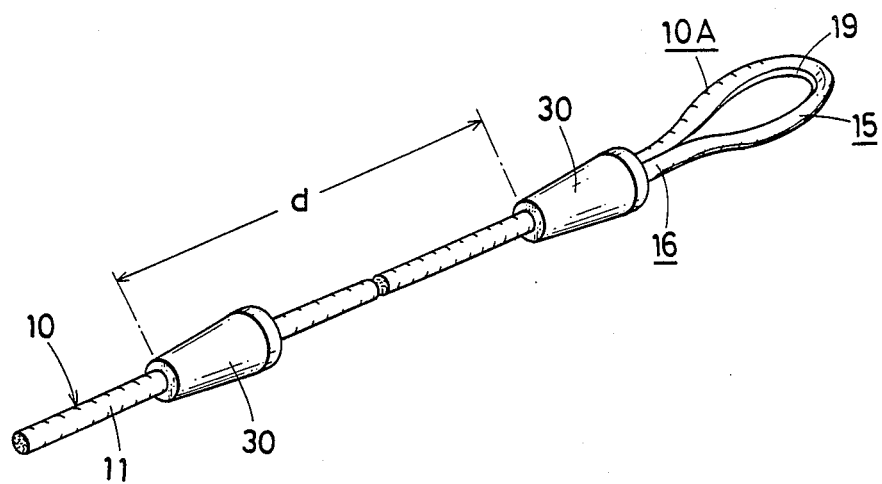
FIG. 3 is a partial perspective view of a tensing rope according to another embodiment of the present invention.
Figures 6, 7:
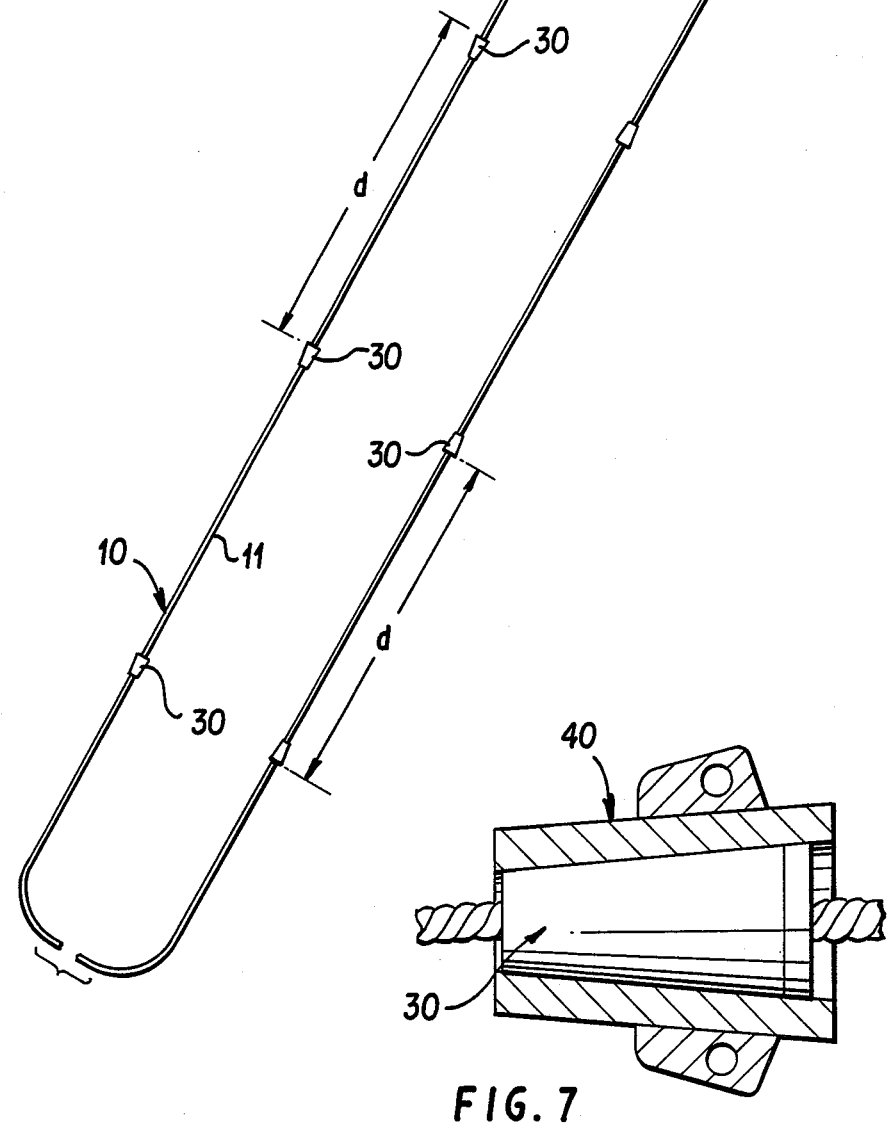
FIG. 6 is an elevational view of an entire tensing rope according to an embodiment of the present invention.
FIG. 7 is a partial cross-sectional view of a line tensing device tensing an embodient of the invention.

The abutment(s) 30 can be provided at one end or both ends of the rope body 11, as shown in FIG. 3 and FIG. 6. In this arrangement, the rope body 11 is preferably provided at its associated end or ends 10A, with a loop (or loops) 15 which can be easily made by bending the end of the rope body 11, so that the bent end is rigidly connected to the rope body 11 in the associated abutment 30. The connection 16 of the bent end of the rope body 11 is integral with the abutment 30.

Alternatively, it is also possible to provide a separate loop 15 which is a separate piece from the rope body 11 and which is rigidly connected to the rope body 11 in the abutment 30. The loop can also be replaced by a hook or a swivel or the like.

In the arrangement shown in FIG. 4, elements corresponding to those in FIG. 2 are designated by the same numerals. The numeral 19 designates a metal thimble which is provided on the inner surface of the loop to reinforce the same.

The numeral 33 designates an inclined inner surface of the outer shell 31 which is provided at the end of the outer shell that has a larger diameter to prevent the rope from coming out of the abutment 30.

As can be understood from the above discussion, according to the present invention, the tensing rope 10 can be stretched by the wire tensing device 40 which has a mouthpiece in which the abutment 30 can be fitted and which is pulled in the direction shown by an arrow in FIG. 5. Furthermore, according to the present invention, since a plurality of abutments 30 are attached to the rope body at a predetermined constant distance along the length thereof, the length of the rope body which has been drawn or pulled to stretch the same can be easily and visually confirmed by counting the number of the abutments which have been moved.

The tensing rope according to the present invention can be advantageously used particularly in an electrical construction, in which the tensing operation of the rope can be highly effective and a safe tensing operation can be ensured even when the construction is on high towers rising into the sky.

I claim:

1. A tensioning rope comprising:
   an elongated rope body, said rope body including a core, said core having a plurality of enlarged portions positioned at intervals extending along a length of the rope body; and
   means to insure proper tension of a guide rope including a plurality of guide rope engaging means, said engaging means being formed on each enlarged portion by a plastic layer that impregnates said core forming each engaging means as integrally formed on said rope body as an integral part of said rope body, said engaging means including fillers and frustum abutments, said frustum abutments including a shell having an outer inclined surface defining abutment wedge surface, said fillers being provided between said shells and said enlarged portions, said fillers firmly connecting the shells to the rope body.

2. A tensing rope according to claim 1, wherein said frustum abutments are spaced from one another at a constant distance on the rope body along the length thereof.

3. A tensing rope according to claim 1, wherein at least one of the frustum abutments is provided on at least one end of the rope body.

4. A tensing rope according to claim 1, further comprising means between the fillers and the shells for increasing the connection therebetween.

5. A tensing rope according to claim 1, wherein said fillers comprise reinforcing members embedded therein.

6. A tensing rope according to claim 1, wherein said rope body comprises an outer protective layer.

7. A tensing rope according to claim 6, wherein said protective layer is made of a plastic material.

8. A tensing rope according to claim 1, wherein said fillers are made of a plastic material.

9. A tensing rope according to claim 8, wherein said fillers are made of epoxy resin.

10. A tensing rope according to claim 1, wherein said rope body is made of an aromatic polyamide resin fiber.

11. A tensing rope according to claim 3, wherein said rope body comprises at least one loop provided at one end of the rope body at which at least one frustum abutment is provided to prevent the engaging means from coming out of the end of the rope body.

12. A tensing rope according to claim 1, wherein said abutment wedge surfaces have an inclination corresponding to an inclined inner surface of a wire tensing device which is to be engaged on the engaging means to tense the tensing rope.

* * * * *